United States Patent [19]

Shimada et al.

[11] Patent Number: 4,608,297

[45] Date of Patent: Aug. 26, 1986

[54] MULTILAYER COMPOSITE SOFT MAGNETIC MATERIAL COMPRISING AMORPHOUS AND INSULATING LAYERS AND A METHOD FOR MANUFACTURING THE CORE OF A MAGNETIC HEAD AND A REACTOR

[75] Inventors: Yutaka Shimada; Hiroshi Kojima, both of Sendai; Takashi Hasegawa, Fujisawa, all of Japan

[73] Assignee: Showa Denka Kabushiki Kaisha, Japan

[21] Appl. No.: 734,827

[22] Filed: May 17, 1985

Related U.S. Application Data

[63] Continuation of Ser. No. 468,794, Feb. 22, 1983, abandoned.

[30] Foreign Application Priority Data

Apr. 21, 1982 [JP] Japan .................................. 57-65500
Dec. 24, 1982 [JP] Japan ................................ 57-232984
Dec. 24, 1982 [JP] Japan ................................ 57-232985

[51] Int. Cl.$^4$ .......................... G11B 5/147; B32B 9/00
[52] U.S. Cl. ..................................... 428/215; 360/125; 360/126; 428/216; 428/426; 428/433; 428/469; 428/472; 428/689; 428/692; 428/693; 428/697; 428/698; 428/699; 428/701; 428/702; 428/900
[58] Field of Search .............. 428/692, 693, 689, 697, 428/702, 900, 215, 216, 426, 433, 469, 472, 698, 699, 701; 360/125, 126

[56] References Cited

U.S. PATENT DOCUMENTS

1,669,642  4/1926  Andrews .............................. 428/693
4,201,837  5/1980  Lupinski .............................. 428/692

FOREIGN PATENT DOCUMENTS

0042525  12/1981  European Pat. Off. .
0084439   7/1981  Japan .
0057854   4/1982  Japan .

*Primary Examiner*—George F. Lesmes
*Assistant Examiner*—William M. Atkinson
*Attorney, Agent, or Firm*—Sughrue, Mion, Zinn, Macpeak, and Seas

[57] ABSTRACT

The present invention relates to an amorphous alloy to a soft magnetic material comprising an amorphous alloy layer, which material has such an excellent magnetic-stability that it does not undergo a secular change and which has a high magnetization and an extremely small magnetostriction.

The soft magnetic material of the present invention comprises at least one amorphous magnetic alloy layer consisting of a composition expressed by $(TM)_{1-x}(M_I, M_{II})_x$, wherein TM essentially consists of Co, $M_I$ is at least one element selected from the group consisting of Zr, Hf, and Y, $M_{II}$ is at least one metallic element selected from the group consisting of Nb, Ta, Mo, and W, x is from 0.05 to 0.2, and the ratio $M_{II}$ ($M_I$ and $M_{II}$) is from 0.3 to 0.9.

The method according to the present invention comprises a step of alternately depositing the amorphous magnetic alloy and an insulating material on a nonmagnetic base, thereby forming a multilayer laminate.

5 Claims, 14 Drawing Figures

MULTILAYER COMPOSITE SOFT MAGNETIC MATERIAL COMPRISING AMORPHOUS AND INSULATING LAYERS AND A METHOD FOR MANUFACTURING THE CORE OF A MAGNETIC HEAD AND A REACTOR

This is a continuation of application Ser. No. 468,794, filed Feb. 22, 1983, now abandoned.

The present invention relates to an amorphous alloy and more particularly to a soft magnetic material comprising an amorphous alloy layer. Furthermore, the present invention relates to a method for manufacturing the core of a magnetic head and a reactor.

As is well known, most of the conventional soft magnetic amorphous alloy materials consist of a transition metal element or elements, such as Fe, Ni, and Co, and a metalloid element or elements, such as Si, B, P, and C. The content of the metalloid element(s) is selected in the range of from 10 atomic% to 30 atomic% so as to prevent crystallization or the formation of crystal phases.

It is also known that soft magnetic amorphous alloy materials which have (1) a magnets striction of virtually zero, (2) a high permeability, (3) no crystal magnetic anisotropy, and (4) a good corrosion resistance can be used as the core of a magnetic head and a reactor and as a magnetic shield. Soft magnetic amorphous alloy materials are hereinafter simply referred to as amorphous magnetic alloys.

A conventional amorphous magnetic alloy which has been investigated in the greatest detail is an Fe-Co-Si-B alloy. When this alloy is annealed at a temperature higher than 100° C., a magnetic anisotrophy is induced and the magnetic properties, for example, the effective permeability ($\mu$eff), tend to deteriorate. The magnetic properties of the Fe-Co-Si-B alloy are therefore thermally unstable. In addition, a secular change in the magnetic properties may disadvantageously take place when, for example, the core of a magnetic head is exposed to a certain temperature during use.

It is known to partly replace the metalloid elements of amorphous magnetic alloys with a IIIa element or elements of the Periodic Table, such as Zr and Hf. Since amorphous magnetic alloys whose metalloid elements are partly replaced with Zr and Hf exhibit a minor but positive component of the magnetostriction constant ($\lambda$s), a magnetic anisotropic field (Hk) is appreciably induced due to stress. In addition, when those amorphous magnetic alloys are heated to a temperature of from 100° C. to 300° C., the effective permeability ($\mu$eff) is greatly decreased. Also, the magnetic properties of those amorphous magnetic alloys are too thermally unstable for the amorphous magnetic alloys to be used as the core of a magnetic head and the like.

Conventionally, the core of a magnetic head has been manufactured by sintering ferrite powder, cutting the ferrite sintered body into thin sections, and laminating or bonding the thin sections to each other.

Recently, methods for manufacturing the core of a magnetic head by using an amorphous magnetic alloy have been energetically investigated. According to a known method, a plurality of amorphous magnetic alloy thin strips are laminated in the form of a core. Transformers and audio devices in which the so-manufactured laminated is mounted are commercially available. It has been attempted to use the laminated core at a frequency higher than that of a transformer and the like because it is desired to enhance the recording and regenerating density of the magnetic heads and, further, because it is desired to frequently use the magnetic heads in video tape recorders (VTR) which are operated at a high frequency, i.e., in megahertz. In such attempts, the amorphous magnetic alloy thin strips are subjected to working, such as lapping, so as to reduce their thickness. However, the smallest thickness obtained by such working is approximately 10 microns and is not very effective for decreasing the eddy current loss of the amorphous magnetic alloy thin strips.

The core of a magnetic head or a reactor, in which core the amorphous magnetic alloy thin strips are laminated, is hereinafter referred to as an amorphous laminated core.

According to a conventional method for manufacturing an amorphous laminated core, a melt having the same composition as amorphous magnetic alloy thin strips is solidified by rapidly cooling, and the obtained thin strips are lapped and then are blanked or cut in the form of a core or core halves. Next, the blanked or cut sections of amorphous alloy thin strips are laminated. This conventional method is complicated and is not highly efficient. In addition, during the production of the amorphous laminated core according to this conventional method, the magnetic characteristics of the amorphous laminated core are influenced by the production methods because, due to the accuracy of lapping and blanking, the thickness and surface roughness of the amorphous magnetic alloy thin strips and the inner and outer dimensions of the core or the core halves are varied.

According to another conventional method for manufacturing an amorphous laminated core, approximately three or less amorphous alloy thin strips are laminated and are sandwiched between a pair of nonmagnetic blocks. Then the obtained lanimated body is subjected to conventional steps, such as cutting it in the form of core halves, inserting spacers into gaps between the core halves, and bonding the spacers and the core halves to each other. In the amorphous laminated core produced by means of this method, only approximately three amorphous alloy thin strips can be used at the most, with the result that the amorphous laminated core exhibits a disadvantageously low intensity of magnetization.

A reactor is conventionally used as a transformer. And recently, due to the development of integrated circuit techniques, a reactor has been used as an inverter, such as a switching inverter and a thyristor inverter. It has also been used as a direct-current source so as to eliminate ripples in a voltage which has been rectified or so as to eliminate a switching surge.

In order to reduce the size of a switching inverter and the like, the switching frequency must be enhanced. The switching loss of a switching inverter and the like is increased in proportion to an increase in the switching frequency, with the result that heat is generated in the switching inverter and the like. In order to decrease the switching loss, the high frequency characteristics of the core of a switching inverter and the like must be excellent, and the core must have a small cross section.

Conventionally, the core of a reactor, e.g., a switching inverter and the like, has been manufactured by sintering ferrite powder in the form of a ring. The high frequency characteristics of a core made of sintered ferrite are not excellent because the sintered core cannot be very small in size and because the ferrite has a Snoek peak. The core of a reactor, especially a transformer, has also conventionally been manufactured by winding a silicon steel strip or a Permalloy strip in the form of a coil.

It has been attempted to use a silicon steel strip or a Permalloy strip as the core of a switching regulator. However, the magnetic properties required in a material adaptable for use as a switching regulator are different from those required in a material adaptable for use as the core of a transformer since a transformer is used at a relatively low frequency. Also, since it is not possible to produce a silicon steel or Permalloy strip having a thickness of less than from 50 to 100 microns, it is difficult to produce a switching regulator having a small cross section. And, in addition, the high frequency characteristics of the switching regulator are not excellent because the eddy current loss and heat generation of the core are great.

An amorphous magnetic alloy has soft magnetic properties which make it adaptable for use as the core of a transformer, and, therefore, research has been energetically carried out in an attempt to manufacture an amorphous alloy core. However, the high frequency characteristics of a core made of a known amorphous alloy are not excellent because the core is made of a coiled or wound strip of the amorphous alloy, and the thickness of the strip is approximately 50 microns at the smallest. A core comprising a coiled or wound thin strip of an amorphous alloy is hereinafter referred to as an amorphous wound core.

It is an object of the present invention to provide a soft magnetic material which has such an excellent magnetic stability that it does not undergo a secular change and which has a high magnetization and an extremely small magnetostriction.

It is another object of the present invention to provide a method for manufacturing an amorphous laminated core which has excellent magnetic properties at a high frequency and which exhibits only a small reduction in the effective permeability ($\mu$eff) at a high frequency. In addition, the provided method should not result in deterioration of the magnetic characteristics of the amorphous laminated core.

In accordance with the objects of the present invention, there is provided a multilayer composite soft magnetic material comprising at least one amorphous magnetic alloy layer and at least one insulating material layer, both layers being laminated, the at least one amorphous magnetic alloy layer consisting of a composition expressed by $(TM)_{1-x}(M_I, M_{II})_x$, wherein TM essentially consists of Co, which may be replaced with less than 10 atomic% of at least one metallic element selected from the group consisting of Fe and Ni, $M_I$ is at least one element selected from the group consisting of Zr, Hf, and Y, $M_{II}$ is at least one metallic element selected from the group consisting of Nb, Ta, Mo, and W, x is from 0.05 to 0.2, and the ratio $M_{II}/(M_I$ and $M_{II})$ is from 0.3 to 0.9.

In accordance with the objects of the present invention, there is also provided a method for producing the core of a magnetic head (an amorphous laminated core) comprising the steps of:
alternately depositing an amorphous magnetic alloy and an insulating material on a nonmagnetic base, thereby forming a multilayer laminate;
simultaneous with or subsequent to alternately depositing the amorphous magnetic alloy and the insulating material on the nonmagnetic base, forming a pair of core halves; and
bonding the pair of core halves to each other via gaps located between the pair of core halves.

In accordance with objects of the present invention, there is further provided a method for manufacturing the core of a reactor (an amorphous laminated core), comprising the steps of:
alternately depositing an amorphous magnetic alloy and an insulating material on a nonmagnetic base, thereby forming a multilayer laminate; and,
simultaneous with or subsequent to alternately depositing the amorphous magnetic alloy and the insulating material on the nonmagnetic base, forming a ring-shaped multilayer laminate.

First, the multilayer composite soft magnetic material of the present invention is described in detail with regard to the composition $(TM)_{1-x}(M_I, M_{II})_x$.

TM is a ferromagnetic component and consists essentially of Co, a certain amount of which may be replaced with at least one element selected from the group consisting of Fe and Ni. The content of Co in the TM must be at least 90 atomic%. The amount of Co which can be replaced without the magnetic properties deteriorating is 10 atomic% at the highest.

$M_I$ is at least one element selected from the group consisting of Zr, Hf, and Y. $M_I$ promotes vitrification of the composition and has a positive magnetostriction component.

Figure 1:
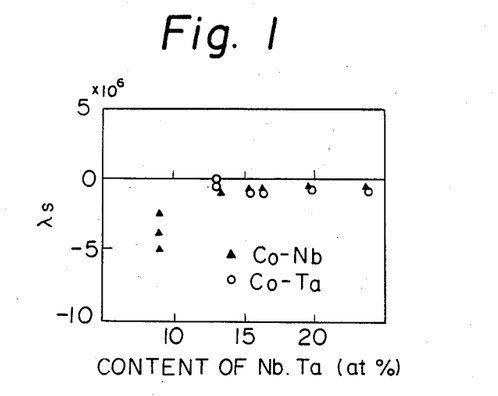
FIG. 1 is a graph showing the relationship between the magnetostriction constant ($\lambda$s) and the Nb and Ta concentration of Co-Nb and Co-Ta alloys, respectively.

$M_{II}$ is at least one element selected from the group consisting of Nb, Ta, Mo, and W and has an negative magnetostriction component, as is apparent from FIG. 1.

Figure 2:
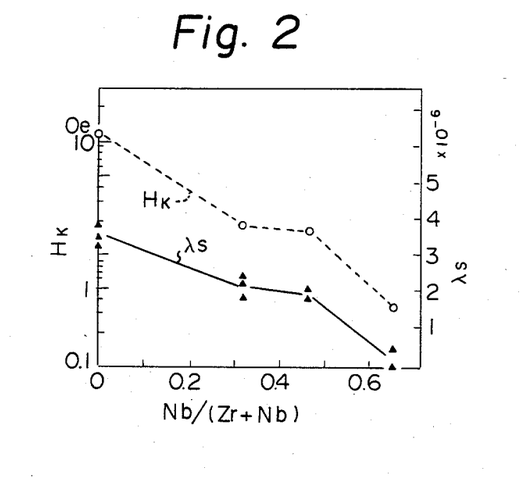
FIG. 2 is a graph showing the relationship between the anisotropic field Hk, the magnetostriction constant ($\lambda$s), and the Nb/(Zr+Nb) ratio.

In one experiment performed by the present inventors, a $Co_{87}(Zr_xNb_{1-x})_{13}$ alloy was heat treated in a magnetic field so as to investigate how the $M_{II}/(M_I+M_{II})$ ratio influences saturation magnetization, magnetostriction, and the anisotropic field Hk. In FIG. 2, the dependence of the anisotropic field Hk and the magnetostriction constant ($\lambda$s) on the Nb/(Zr+Nb) ratio is shown. As is apparent from FIG. 2, the magnetostriction is virtually zero and the anisotropic field Hk is very small when the Nb/(Zr+Nb) ratio is 0.65.

The ratio $M_{II}/(M_I+M_{II})$ must be from 0.3 to 0.9 so as to attain a very small or virtually zero magnetostriction in terms of the magnetostriction constant ($\lambda$s).

Second, the properties of the amorphous magnetic alloy of the present invention are described in detail.

One of the outstanding properties of the amorphous magnetic alloy of the present invention is that the alloy has a small or virtually zero magnetostriction in terms of the magnetostriction constant ($\lambda$s). Because of this property, the amorphous magnetic alloy of the present invention exhibits very thermally stable magnetic properties. Especially, ther permeability does not tend to seriously decrease when the amorphous magnetic alloy is kept at a high temperature.

Figure 3:
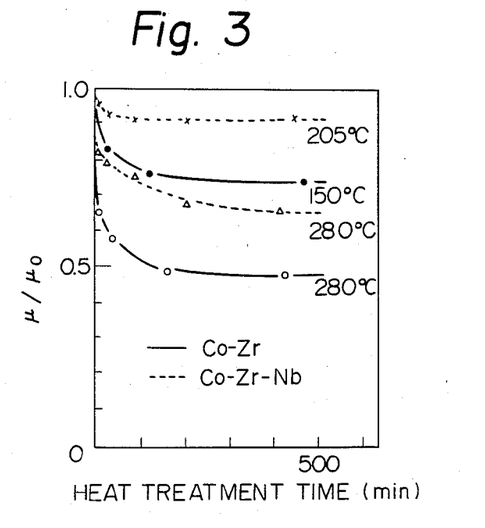
FIG. 3 is a graph showing the relationship between the $\mu/\mu_0$ ratio and the heat treatment time.

In another experiment performed by the present inventors, $Co_{87}Zr_5Nb_8$ alloy thin strips and $Co_{50}Zr_{50}$ thin strips were heat treated at the temperatures shown in FIG. 3 for a long period of time. The permeability was measured before and after the heat treatment, and the ratio $\mu/\mu_0$, i.e., the ratio of the permeability after heat treatment to the permeability before heat treatment, was calculated. The results are also shown in FIG. 3. As is apparent from FIG. 3, the permeability of the $Co_{87}Zr_5Nb_8$ alloy thin strips was more thermally stable than that of the $Co_{50}Zr_{50}$ thin strips.

The amorphous magnetic alloy of the present invention has a high saturation magnetization, a low-induction magnetic anisotropy, and a low magnetostriction constant ($\lambda$s) which is not varied greatly even when the contents of $M_I$ and $M_{II}$ vary somewhat.

Third, the structure of the multilayer composite soft magnetic material of the present invention is described.

The amorphous magnetic alloy layer(s) of the multilayer composite soft magnetic material is preferably in the form of a film. The thickness of the amorphous magnetic alloy layer(s) is preferably 2 microns or less, more preferably 1 micron or less, when an amorphous laminated core is used as the core of the magnetic head. The thickness of the amorphous magnetic alloy layer(s) is preferably 10 microns or less, more preferably 1 micron or less, when an amorphous laminated core is used as the core of a reactor.

When the thickness of the amorphous magnetic alloy layer is small, the eddy current loss and the decrease in the effective permeability ($\mu$eff) at a high frequency, i.e., in megaherty, can be advantageously kept small. However, when the thickness of the amorphous magnetic alloy layer is small, the intensity of magnetization becomes small. The intensity of magnetization can be increased by using a plurality of amorphous magnetic alloy layers.

These amorphous magnetic alloy layers may be thin films formed by means of the rapid cooling method, the vacuum-evaporation method, the ion-evaporation method, the ion-plating method, or a sputtering method. A sputtering method is preferably since the composition $(TM)_{1-x}(M_I, M_{II})_x$ can be easily vitrified.

When the content of $M_I$ and $M_{II}$ is increased, good magnetic properties can be obtained. An amorphous magnetic alloy layer may be deposited on an insulating material layer by means of a sputtering method. In this case, the bonding between the two layers is excellent.

The insulating material layer may consist of $SiO_2$, $Al_2O_3$, ceramic material, glass, and the like. The insulating material layer should have a good reactivity and should adhere well to the amorphous magentic alloy layer.

The insulating material layer preferably has a thickness of 0.05 micron or less, more preferably approximately 0.02 micron, when an amorphous laminated core is used as the core of a magnetic head. The insulating material layer preferably has a thickness of 1 micron or less, more preferably approximately 0.02 micron, when an amorphous laminated core is used as the core of a reactor.

Usually, a plurality of laminates, each of which consists of an amorphous magnetic alloy layer and an insulating material layer, are laminated in accordance with the present invention. The total number of layers in the multilayer composite soft magnetic material of the present invention is determined depending on how the material is to be used and is usually from twenty to forty when the material is used as the core of a magnetic head. The thickness of an amorphous laminated core corresponds to the tracking width of the magnetic head, which tracking width is from 38 microns to 58 microns in the case of a VTR head. When the multilayer composite soft magnetic material of the present invention is used as the core of a reactor, the thickness of the core is usually from 10 microns to 100 microns.

In the multilayer composite soft magnetic material of the present invention, the high frequency characteristics are excellent because each of the amorphous magnetic alloy layers which are thin and exhibit excellent and thermally stable magnetic properties, are insulated from each other by the insulating material layers.

The methods for manufacturing the amorphous laminated core of the present invention are now described. The nonmagnetic base used in these methods may consist of any paramagnetic material but preferably consists of glass, ceramics, and a heat-resistant macromolecular material since these substances exhibit a good reactivity and adhere well to the amorphous magnetic alloy layers and since they also exhibit a thermal expansion which is almost equal to that of the amorphous magnetic alloy films, with the result that a strongly bonded amorphous laminated core can be manufactured. The thickness of the nonmagnetic base is not limited but is preferably from 0.1 mm to 0.2 mm when an amorphous laminated core is manufactured for as the core of a reactor and is preferably from 0.05 mm to 0.2 mm when an amorphous laminated core is manufactured for use as the core of a magnetic head.

First, the steps for manufacturing an amorphous laminated core for use as the core of a magnetic head are described in detail.

A nonmagnetic base having a semicircular shape or a pair of nonmagnetic bases having a horseshoe shape is used as the base on which the amorphous magnetic alloy and the insulating material are alternately and preferably consecutively deposited so as to form, simultaneous with alternately depositing the amorphous magnetic alloy and the insulating material on the base, a multilayer laminate having the same shape as the core halves of the magnetic head. The use of such a base is advantageous because no stress, resulting in deterioration of the magnetic properties, is induced during the formation of the core body or half of the core body. Alternately, the multilayer laminate may be machined so as to form a pair of core halves. In addition to machining, any other methods, such as cutting with a diamond tool, ultrasonic working, laser working, and blanking, may be used. Blanking is advantageous when the nonmagnetic base is a polyimide film because a high manufacturing efficiency can be attained.

The core halves have a symmetrical shape and oppose each other over two gaps, one of which is referred to as a core gap. Known insulating material, such as $SiO_2$, spinel ($Al_2O_3 \cdot MgO$), and the like, is inserted into the core gap, and known electric conductive material, such as a Cu-Ag alloy and the like, is inserted into the other gap. The Cu-Ag alloy, $SiO_2$ and the like are deposited on the ends of the core halves by means of, for example, a sputtering method. The core halves are then bonded to each other, and a magnetic path is formed via the gaps through the bonded core halves. The core halves are annealed, if necessary, before or after they are bonded. A dummy base, which preferably has the same shape as the nonmagnetic base and which preferably consists of the same material as the nonmagnetic base, is preferably bonded to the bonded core halves opposite the nonmagnetic base side so as to enhance the rigidity of the amorphous laminated core. The dummy base usually has a round periphery and a central aperture, the same as the core.

Second, the steps for manufacturing an amorphous laminated core for use as the core of a reactor are described in detail. These steps are basically the same as those for manufacturing an amorphous laminated core for use as the core of a magnetic head. The multilayer laminate has a ring shape, the formation of which is the major difference between the steps for manufacturing an amorphous laminated core for use as the core of a magnetic head and those for manufacturing an amorphous laminated core for use as the core of a reactor. The multilayer laminate may be given a ring shape by machining the multilayer laminate or by alternately depositing the amorphous magnetic alloy and the insulating material on a nonmagnetic base having a ring shape.

The multilayer composite soft magnetic material according to the present invention has an excellent thermal stability with regard to the magnetic properties and a high effective permeability ($\mu$eff). The amorphous laminated core according to the present inventin can be used as the core of a magnetic head at a high frequency of up to 500 MHz. In addition, the size and weight of the amorphous laminated core according to the present invention are considerably reduced as compared with those of conventional amorphous laminated cores.

The method for manufacturing the core of a magnetic head and a reactor according to the present invention involves no disadvantages since the magnetic properties of the core do not deteriorate, this being due to, for example, accurate shaping of the core and non-movement of the walls of the magnetic domain induced in the amorphous magnetic alloy layers.

The present invention is further explained with reference to the examples.

EXAMPLE 1

Figure 8:
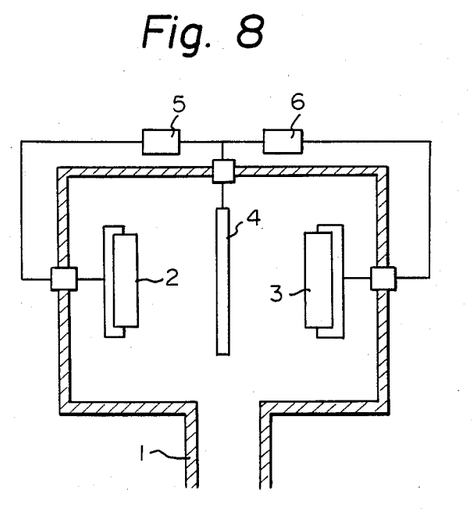
FIG. 8 is an illustration of a sputtering device.

A multilayer composite soft magnetic material was produced by using the sputtering apparatus shown in FIG. 8. In FIG. 8, an electrode 2 made of an amorphous magnetic alloy, i.e., $Co_{87}Zr_5Nb_8$, and an electrode 3 made of an insulating material, i.e., $SiO_2$, were disposed in a vacuum vessel 1. A nonmagnetic base 4 was rotatably positioned between the electrodes 2 and 3 by a rotating device (not shown). Direct and alternating-current sources are denoted by reference numerals 5 and 6.

The sputtering conditions were as follows:

A. Diameter of Electrodes 2 and 3: 100 mm
B. Sputtering Power: 70-150 w
C. Argon Gas Pressure in Vacuum Vessel 1: $1 \times 10^{-3}$ to $10 \times 10^{-3}$ Torr
D. Rate of Deposition of Amorphous Magnetic Alloy Layer and Insulating Material Layer:

90~160 Å/min

Figure 5:
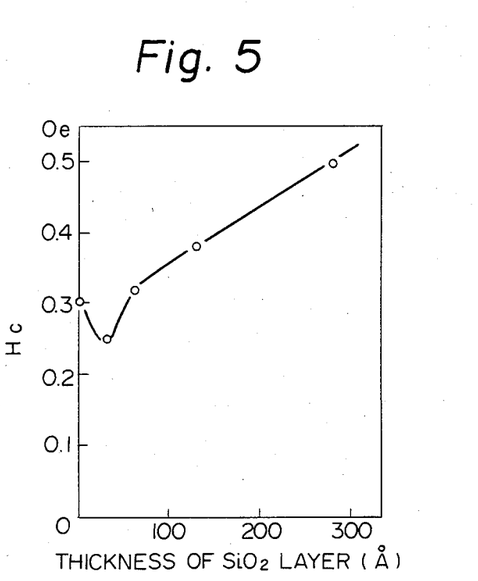
FIG. 5 is a graph showing the relationship between the coercive force Hc and the thickness of the $SiO_2$ layer.

A 0.15 micron-thick $Co_{87}Zr_5Nb_8$ layer and a $SiO_2$ layer were alternately deposited on the nonmagnetic base 4, which consisted of a satisfactorily smooth glass plate, so as to produce a multilayer composite soft magnetic material comprising two $Co_{87}Zr_5Nb_8$ layers and one $SiO_2$ layer. This deposition was repeated by varying the thickness of each of the $SiO_2$ layers up to 300 Å. The coercive force Hc of the multilayer composite soft magnetic material was measured and is shown in FIG. 5. As is apparent from FIG. 5, the thickness of the $SiO_2$ layer is preferably 100 Å or less.

EXAMPLE 2

The procedure of Example 1 was repeated so as to produce a multilayer composite soft magnetic material comprising twelve 0.5 micron-thick $Co_{87}Zr_5Nb_8$ layers and twelve 150 Å-thick $SiO_2$ layers.

Figure 4:
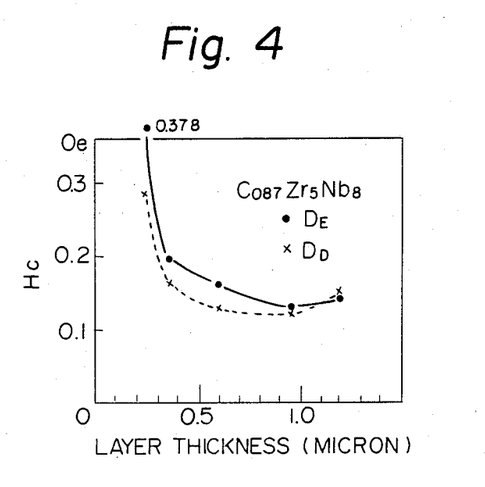
FIG. 4 is a graph showing the relationship between the coercive force Hc and the thickness of the amorphous magnetic alloy layer.

A $Co_{87}Zr_5Nb_8$ layer having a thickness of from 0.3 to 1.2 microns was deposited on the nonmagnetic base, and its coercive force Hc was measured. The results are shown in FIG. 4. In FIG. 4, $D_E$ and $D_D$ indicate the easy direction of magnetization and the difficult direction of magnetization, respectively. As is apparent from FIG. 4, the coercive force Hc is very low at $D_E$ and $D_D$ when the thickness of the $Co_{87}Zr_5Nb_8$ layer is 1 micron or more. A comparative example comprising a 6 micron-thick $Co_{87}Zr_5Nb_8$ layer was produced based on this finding.

Figure 6:
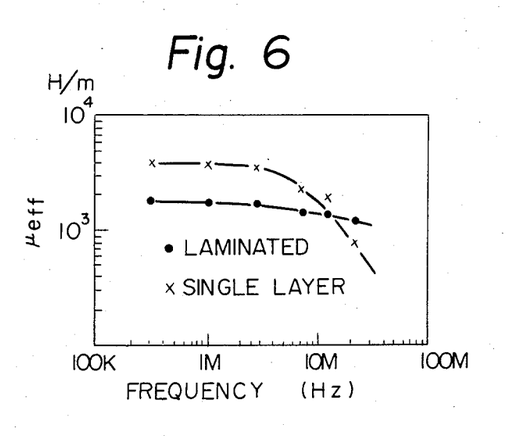
FIG. 6 is a graph showing the relationship between the effective permeability $\mu$eff and the frequency applied to amorphous magnetic alloys.

The effective permeability ($\mu$eff) of the mutilayer composite soft magnetic material mentioned above and a 6 micron-thick $Co_{87}Zr_5Nb_8$ layer (the comparative example) at a frequency of 300 KHz to 20 MHz was measured. The results are shown in FIG. 6. As is apparent from FIG. 6, the multilayer composite soft magnetic material exhibited a small decrease in the effective permeability ($\mu$eff) at a high frequency.

Figure 7:
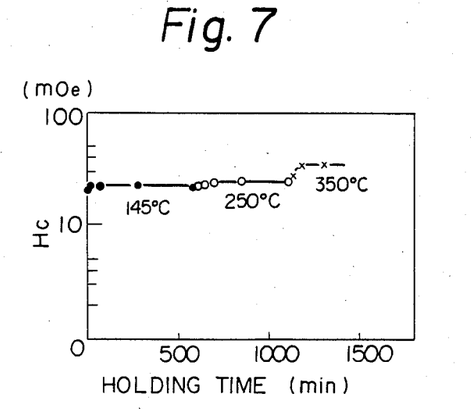
FIG. 7 is a graph showing the relationship between the coercive force Hc and the holding time.

The multilayer composite soft magnetic material was successively subjected to heating at 145° C. (●), 250° C. (o), and 350° C. (x), as is shown in FIG. 7. In FIG. 7, the relationship between the holding time at a predetermined temperature and the coercive force Hc are illustrated. As is apparent from FIG. 7, the multilayer composite soft magnetic material of the present invention exhibited a very excellent thermal stability in regard to the coercive force.

EXAMPLE 3

Figure 9:
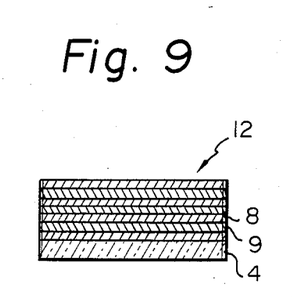
FIGS. 9 through 12 illustrate an embodiment of the method for manufacturing an amorphous laminated core.
Figure 10:
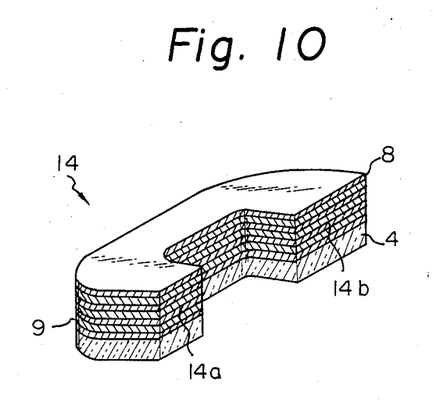
Figure 11:
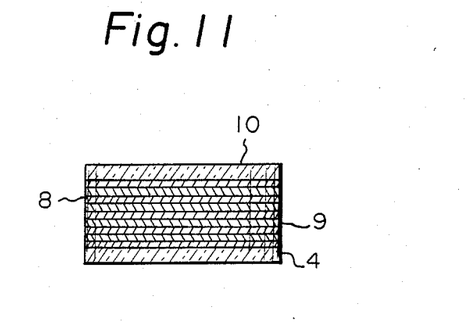

In order to manufacture the core halves of a magnetic head, the procedure of Example 1 was repeated except for the following conditions:

A. Argon Gas Pressure in Vacuum Vessel 1: $3 \times 10^{-3}$ Torr
B. Rate of Deposition of Amorphous Magnetic Alloy Layers and Insulating Material Layers: 0.5 micron/min The produced multilayer composite soft magnetic material (12 in FIG. 9) comprised fifteen 1.0 micron-thick $Co_{87}Zr_5Nb_8$ layers 8 and fourteen 0.015 micron-thick $SiO_2$ layers 9. The multilayer composite soft magnetic material 12 was subjected to ultrasonic working so as to produce a core half 14 (FIG. 10). In order to remove the magnetic anisotropy, the core half 14 was heat treated at a temperature of 370° C. for a period of 30 minutes while a rotating magnetic field was applied thereto. The magnetic properties of core half 14 were measured, and the results were as follows:

Coercive force Hc: 0.02 Oe
  Saturation Flux Density: 11,000 G
  Initial Permeability ($\mu$i): 20,000
  Effective Permeability ($\mu$eff) at 10 MHz; 2000

Figure 12:
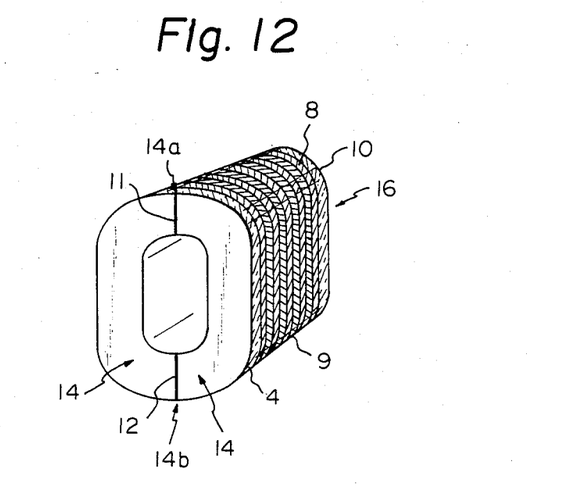

The other core half was also produced by the procedure described above. The gap surface 14a and the back gap surface 14b of both core halves were smoothly finished by lapping. A 0.3 mm-thick SiO$_2$ film 11 (FIG. 12) was formed on the gap surface 14a of one of the core halves. The core halves 14 were arranged opposite to one another and were bonded to each other. As FIG. 12 shows, a spacer 12 was sandwiched between the back gap surfaces 14b, and a 0.1 mm-thick protective plate 10, made of the same kind of glass as the nonmagnetic base 4, was bonded on the core halves 14, thereby completing the core 16 of the magnetic head.

EXAMPLE 4

Figure 13:
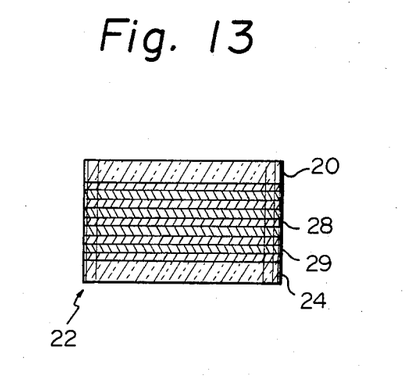
FIGS. 13 and 14 illustrate an embodiment of the method for manufacturing an amorphous wound core.
Figure 14:
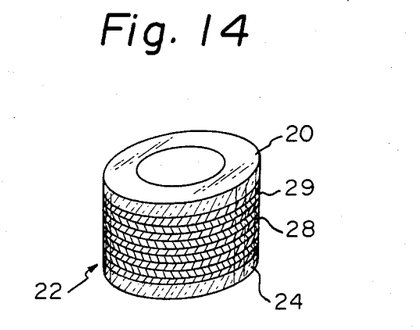

A multilayer composite soft magnetic material was produced by the same procedure as in Example 3 and was subjected to ultrasonic working so as to produce a ring-shaped body. The ring-shaped body was subjected the same heat treatment as in Example 3 so as to remove the magnetic anisotropy. A dummy base 20 (FIG. 13) consisting of the same material as the nonmagnetic base was bonded with a binder to the top of the ring-shaped body. The dummy base 20 was preliminarily shaped so that it had the same ring shape as the ring-shaped body and was them bonded in the manner mentioned above. In FIGS. 13, and 14 reference numerals 22, 24, 28, and 29 denote an amorphous laminating material layers, respectively. The magnetic properties of the amorphous laminated core 22 were measured, the results being as follows:

Coercive Force (Hc)=0.02 Oe
  Saturation Flux Density (Bs): 10,000 G
  Initial Permeability ($\mu$i): 30,000
  Effective Permeability ($\mu$eff) at 100 MHz: 1500

EXAMPLE 5

A multilayer composite soft magnetic material comprising twelve 0.5 micron-thick Co$_{87}$Zr$_5$Nb$_8$ layers and nineteen 0.01 micron-thick SiO$_2$ layers was produced by the same procedure as in Example 4 except that the above-mentioned alyers were deposited on a ring-shaped nonmagnetic base having an outer diameter of 10 mm, an inner diameter of 6 mm, and a thickness of 0.1 mm, the sputtering power being 400 w. The produced multilayer composite soft magnetic material had a ring shape. It was not subjected to ultrasonic working, and a dummy base was bonded threto in the same manner as in Example 4. The magnetic properties of the amorphous laminated core 22 were measured, the results being as follows:

Coercive Froce (Hc): 0.02 Oe
  Saturation Flux Density (Bs): 12,000 G
  initial Permeability ($\mu$i): 30,000
  Effective Permeability ($\mu$eff) at 100 MHz: 1500.

We claim:

1. A multilayer composite soft magnetic material comprising a non-magnetic base having provided thereon by sputtering a plurality of laminates, said plurality of laminates having an effective permeability ($u_{eff}$) between $10^3$ and $10^4$ at a frequency of between 20 KHz and 100 MHz, and an overall thickness of less than or equal to 100 microns, wherein each of said laminates comprises an amorphous magnetic alloy layer and an insulating material layer, wherein each of said amorphous magnetic layers exhibits virtually zero magnetostriction and consists of a composition expressed by (TM)$_{1-x}$(M$_I$, M$_{II}$)$_x$, wherein TM consists essentially of greater than 90 and up to 100 atomic percent Co, and 0 to less than 10 atomic percent of at least one metallic element selected from the group consisting of Fe and Ni, M$_I$ is least one element selected from the group consisting of Zr, Hf, and Y, M$_{II}$ is at least one metallic element selected from the group consisting of Nb, Ta, Mo, and W, x is from 0.05 to 0.2, and the ratio M$_{II}$/(M$_I$ and M$_{II}$) is from 0.3 to 0.9, wherein each of said insulating material layers consist of one member selected from the group consisting of SiO$_2$, Al$_2$O$_3$, ceramic material, and glass, and, wherein the thickness of each of said amorphous magnetic alloy layers is 10 microns or less, and the thickness of each of said insulating material layers is from about 30 angstroms to about 500 angstroms.

2. The multilayer composite soft magnetic material according to claim 1, wherein said material is employed in a magnetic head and the thickness of each of said amorphous magnetic alloy layers is 1 micron or less and the thickness of each of said insulating material layers is 0.05 microns or less.

3. The multilayer composite soft magnetic material according to claim 2, wherein the thickness of each of said insulating material layer is from 0.02 $\mu$m or less.

4. The multilayer composite soft magnetic material according to claim 1, wherein said material is employed in a reactor, the thickness of each of said insulating material layer is from 1 $\mu$m or less.

5. The multilayer composite soft magnetic material according to claim 4, wherein the thickness of each of said insulating material layer is from 0.02 $\mu$m or less.

* * * * *

UNITED STATES PATENT AND TRADEMARK OFFICE
CERTIFICATE OF CORRECTION

PATENT NO. : 4,608,297
DATED : August 26, 1986
INVENTOR(S) : Yutaka Shimada et al It is certified that error appears in the above-identified patent and that said Letters Patent is hereby corrected as shown below:

Title page:

Line [73], delete "Denka" and insert --Denko--.

Claim 1, line 4, delete "$(u_{eff})$" and insert --$(\mu_{eff})$--;

line 18, after "is" insert --at--.

Signed and Sealed this

Eighteenth Day of November, 1986

Attest:

DONALD J. QUIGG

*Attesting Officer*         *Commissioner of Patents and Trademarks*